Feb. 7, 1950 J. M. HOPWOOD 2,496,667
THREADLESS COUPLING

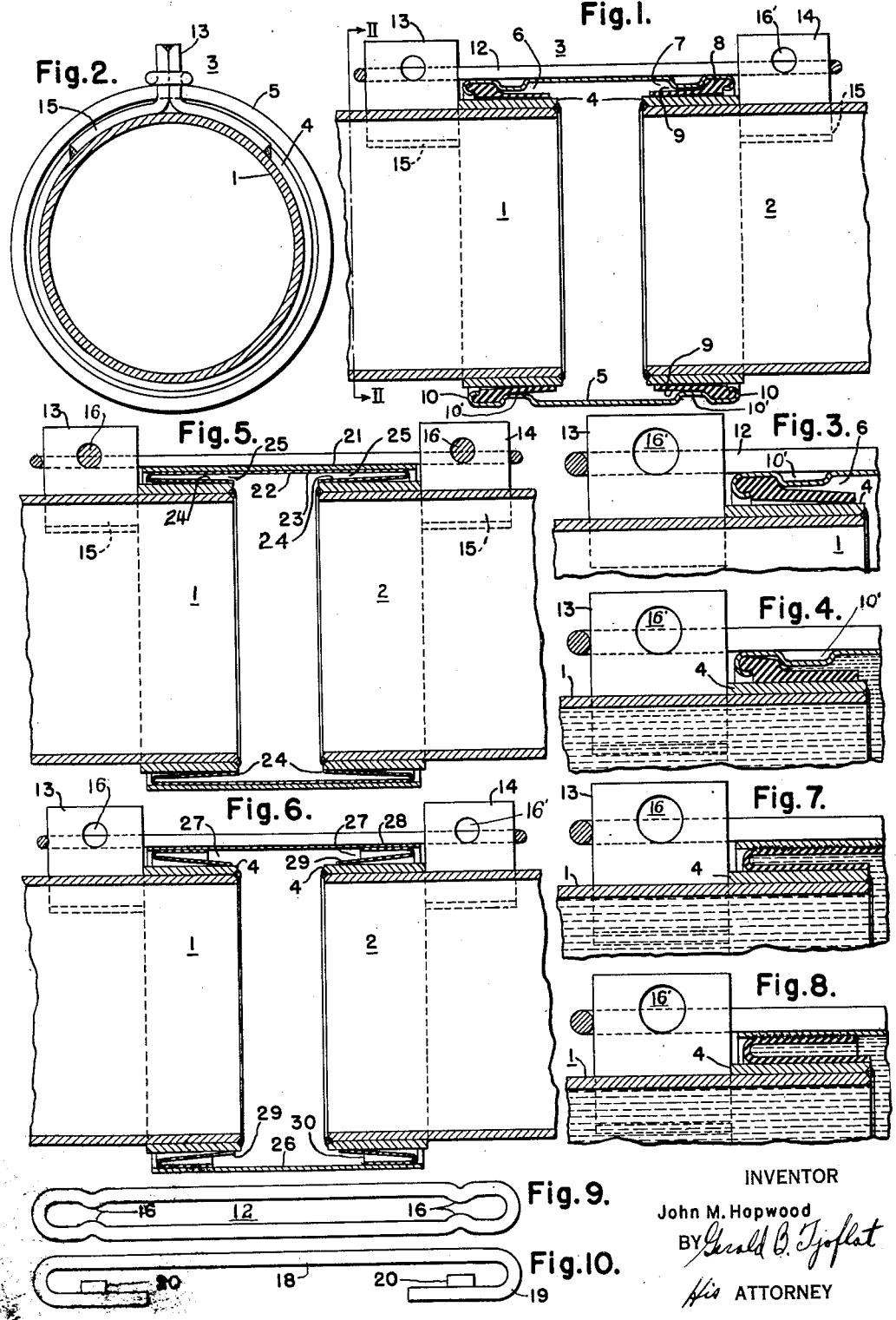

Filed Jan. 15, 1947 2 Sheets-Sheet 2

INVENTOR:
John M. Hopwood
BY Gerald B. Tjoflat
His ATTORNEY

Patented Feb. 7, 1950

2,496,667

UNITED STATES PATENT OFFICE 2,496,667

THREADLESS COUPLING

John M. Hopwood, Mount Lebanon, Pa., assignor to Hagan Corporation

Application January 15, 1947, Serial No. 722,102

1 Claim. (Cl. 285—193)

This invention relates to pipe couplings and more particularly to threadless couplings for joining pipe sections which carry fluids, including both liquids, gases and the like.

An object of this invention is to provide a threadless pipe coupling that is capable of joining the adjacent ends of two pipes through which fluid such as water flows and which is so designed that the pressure of the water acting on parts of the coupling causes a fluid-tight joint to be formed.

A further object of the invention is to provide a threadless pipe coupling by means of which sections of threadless pipe may be quickly coupled together to form a pipe line through which fluids, such as water for example, may be distributed for various purposes. The coupling is provided with a packing that is actuated by the pressure of the water to form tight joints at the point where the pipes are in contact with the coupling. Also there is provided a means for holding the pipe sections in the coupling against the force of the liquid pressure so that they may not be readily separated from the couplings.

Other objects of the invention will, in part, be apparent and will, in part, be obvious from the following description taken in conjunction with the accompanying drawings in which:

Figure 1 is a fragmentary view in longitudinal section of the ends of two lengths of pipe and a coupling embodying one form of the invention, by means of which the lengths of pipe have been connected together to form a fluid pressure-tight joint therebetween;

Figure 2 is a cross section on the line II—II of Figure 1;

Fig. 3 is an enlarged view in section of one end of the coupling showing how the packing of the coupling engages the end of a length of pipe before fluid under pressure acts on it;

Fig. 4 is a view similar to Fig. 3, showing how the packing is actuated by the pressure of the fluid into pressure-sealing engagement with the pipe end;

Figs. 5 and 6 are views similar to Fig. 1, showing different modifications of the coupling;

Figs. 7 and 8 are enlarged views in section of one end of the couplings shown in Figs. 5 and 6, illustrating how the fluid under pressure actuates the packing into operative pressure-sealing engagement with the pipe end;

Figs. 9 and 10 are views in top plan and side elevation respectively of a link for holding the ends of pipe in the coupling against the pressure of the fluids;

Throughout the drawings and the specifications, like references indicate like parts.

Figure 11:
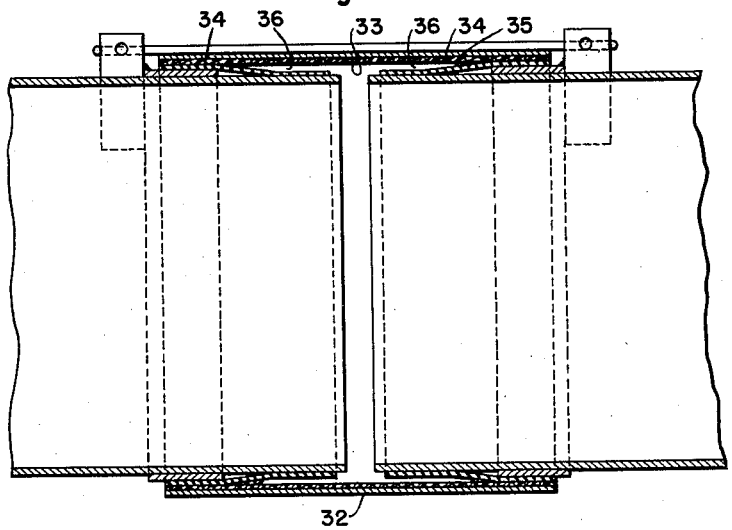
Fig. 11 is a view in longitudinal section of two pipe lengths joined at their adjacent ends by a coupling illustrating a further modified form of packing.

In Fig. 1 of the drawings, the adjacent ends of two lengths of pipes 1 and 2 are shown coupled by means of a coupling 3 arranged and constructed in accordance with an embodiment of the invention. If the pipes to be coupled are made of light weight and their gauge metal such as aluminum or aluminum alloy for example, it may be necessary to reinforce the ends thereof by means of stiffening collars 4 to protect the ends against accidental distortion and to preserve the contour of the pipe ends. When pipes of steel or other more rigid metals are to be coupled, these reinforcing rings need not be used if the wall thickness of the pipes is sufficiently heavy to retain the contour of the pipe ends under ordinary and usual conditions of use.

Coupling 3 comprises a ferrule 5 and elastic packing rings 6 and 7 disposed on the inside and at the opposite ends of the ferrule. Rings 6 and 7 may be made of elastic material such as natural or synthetic rubber suitable for molding into the size, form and shape desired.

As shown in Fig. 1, rings 6 and 7 are preferably identical in shape so that they may be mounted in and secured to the ferrule in the same manner, thereby simplifying the manufacture thereof. Since the rings are of like form and shape, only one of them need be described in detail.

Ring 6 is made relatively thick at one end as at 8 and thinner at the other as at 9. The ring is placed in the end of the ferrule with the thick end adjacent the end of the ferrule. The end of the ferrule is pressed or spun to provide a flange 10 that tightly grips the thick end of ring 6. When so mounted and secured, the thinner end of ring 6 tapers toward the longitudinal axis of ferrule 5. Thus when the end of a pipe is inserted into the coupling, end 9 of the ring will grip the pipe.

To more securely anchor the thick ends of rings 6 and 7 to the ends of ferrule 5, grooves 10' may be rolled into the ferrule. These grooves also act to space the inner or thin ends of the packing rings from the wall of the ferrule to insure that the fluid may get between them and force them into contact with the pipe ends and provide a pressure-tight joint.

When the ends of adjacent pipes have been inserted into the coupling and fluid, such as water, under pressure is passed through the pipes, the pressure will exert a force on the thin end of the packing rings 6 and 7 in a radial direction towards the center of the coupling. This pressure acting radially and circumferentially on the inner ends of the packing rings will cause these rings to grip the pipe ends firmly and with sufficient force to prevent leakage at the coupling.

In the enlarged view of Fig. 3, the packing ring is shown without fluid pressure applied to it, but in Fig. 4 the effect of fluid pressure is shown. In Fig. 3, only a small part of the inner end of the packing ring is in contact with the pipe end, but in Fig. 4 it can be seen that substantially the full width of the packing ring is in contact with the pipe end.

To make certain that the lengths of pipe will not be displaced longitudinally and cause the ends thereof to pull out of the coupling, an anchor member 12 and anchor lugs 13 and 14 are provided. Each of anchor lugs 13 and 14 has an arcuate base 15 that is welded, brazed or otherwise secured to pipes 1 and 2.

Anchor member 12 is shown in Fig. 9 and comprises an elongated loop having detents 16 near the ends of the side-bars thereof and positioned to register with openings 16' in the anchor lugs when the anchor loop is fitted over the lugs. The detents are for the purpose of locking the anchor member 12 to the lugs.

In Fig. 10 a modified form of anchor is shown that comprises a single reach element 18 and hooked end portions 19 adapted to receive the anchor lugs 13 and 14. The hooks may be provided with lugs 20 positioned to register with lug openings 16' when mounted in place over the lugs on adjacent pipe ends.

The coupling shown in Fig. 5 comprises a ferrule 21 and a packing element 22. The ferrule is cylindrical and circular in cross-section. The packing element 22 comprises a cylindrical body portion 23 of elastic material, such as rubber, either natural or synthetic, having packing rings 24 at the ends thereof, which are unitary with the body portion 23. The ring portions 24 and body portion 23 may be molded to provide uniformity of shape, the desired rigidity and the desired amount of spacing between the body portion 23 and the rings.

As may be seen in the drawing, the outer ends of the ring portions are unitary with the outer ends of the body portion 23. The rings taper towards the central or longitudinal axis of the ferrule, so as to provide spaces 25 between the body portion and the ring portions. Thus when the ends of pipe sections are inserted into the coupling, the ring portions grip the pipe ends so that when fluid is passed through the various lengths of coupled pipe, the pressure of the fluid can get into the spaces 25 and squeeze the ring portions tightly into contact with the pipe, as shown in the enlarged view of Fig. 7, thus insuring a substantially leak-proof joint at the coupling.

In Fig. 6 is shown a still further modified form of coupling. This coupling comprises a cylindrical ferrule 26 which is circular in cross-section, and packing members 27 disposed at the opposite ends thereof. Packing members 27 are unitary in construction and are made of rubber, either synthetic or natural, preferably in a mold to give them the predetermined shape or form. As shown, packing members 27 each comprise a ring portion 28 which is cemented or otherwise secured to the inner wall of the ferrule and a tapered ring portion 29. The outer ring edge of ring portion 29, that is, the edge adjacent the end of the coupling, joins the outer end or edge of the ring portion 28 and then tapers inwardly toward the longitudinal axis of the ferrule so as to provide a space 30 of substantially V-shape therebetween. Thus, when pipe ends are inserted into the coupling, the ring portions 29 will grip the pipe ends to a greater or lesser extent, but when fluid under pressure is passed through the pipe and gets into the V-shape space 30, the ring portions 29 are forced inwardly against the pipe ends thus forming a fluid tight joint.

Figure 12:
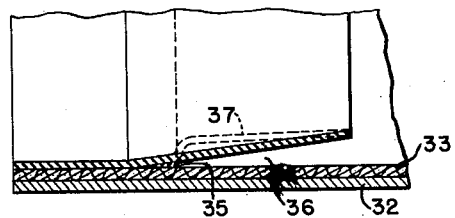
Fig. 12 is an enlarged partial view of one end of the coupling shown in Fig. 11.
Figure 13:
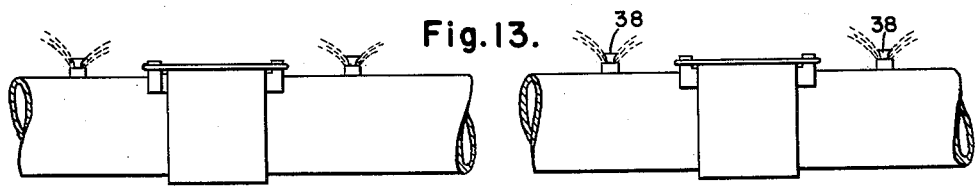
Fig. 13 is a view of a plurality of lengths of pipe in which the pipe ends are joined together with couplings embodying the invention, the pipe lengths being provided with nozzles whereby water, for example, may be distributed onto soil to be irrigated.

In Fig. 11, there is shown a further modified form of coupling that comprises a ferrule 32 which is cylindrical and of uniform circular cross-section throughout its length. The inside of this ferrule is lined with a rubberized fabric 33 to which the packing rings 34 may be cemented or vulcanized. These rings are each provided with a fillet 35 at about their middle portion which causes the inner ends of the packing rings to be spaced from the liner 33 as shown at 36. When pipe ends are inserted into this coupling, the inner ends of the packing ring 34 grips the pipe ends to a greater or lesser extent, but when fluid under pressure is passed through the pipe, the fluid gets into the space 36 and causes the freer ends of the packing rings to squeeze down tightly on the pipe ends as indicated by the broken line position 37 of Fig. 12.

The couplings above described are utilized for joining lengths of pipe which are to be moved about from place to place for purposes such as irrigating the soil in orange groves or any other soil requiring irrigation. The pipe lengths would be provided with spray nozzles, such as indicated at 38, spaced at predetermined intervals along the lengths of the various pipe sections. Such pipes may be made of light metal, such as aluminum or thin, light-gauge steel, so that a number of lengths of pipe may be easily carried from one place to another by hand. This type of construction makes it possible to join a large number of lengths of pipe together without the necessity of having threaded couplings and makes it possible to quickly and easily make or break joint between various lengths of pipe.

Under test, couplings such as disclosed herein, have been found to be leak-proof at pressures as high as 400 pounds per square inch.

While irrigation has been mentioned as an application for the pipe coupling, it is obvious that it would be suitable for joining lengths of pipe for other purposes where threadless couplings are desired. Couplings of this type are well suited for the laying of temporary pipe lines or for pipe lines which must be moved frequently. They are also adaptable where it may be necessary for one or two men to break joint, in which cases the pipe sections can be handled easily and safely.

It will be apparent to one skilled in the art that my coupling may be used to join pipes in which liquids other than water may be carried. Provided oil-resistant packings are employed, the coupling would be suitable for joining oil field tubing through which various petroleum products might flow. Crude oil, lubricating stock, naphtha, kerosene and gasoline are typical products which could be handled with safety. In addition, gases of various sorts could also be pumped through threadless tubing joined by my couplings.

Having thus described the invention, what I claim as new and desired to secure by Letters Patent is:

A coupling for pipe, conduit and the like adapted to carry fluids, water and the like, comprising a cylindrical ferrule having on its inner surface a rubberized fabric liner cemented thereto, rubber rings on the inside of said ferrule, one at each end thereof, the outer end of each ring being cemented to the fabric, and a fillet between the middle portion of each ring and said fabric liner to cause the inner ends of said rings to flare inwardly towards the center of said ferrule when no radial pressure is exerted on said rings, said coupling being characterized by the fact that when adjacent ends of pipe sections are inserted into said coupling and fluid under pressure is passed through the pipe sections, the inner ends of said rings are squeezed by the pressure of the fluid into pressure tight engagement with the outer surfaces of the ends of said pipe sections.

JOHN M. HOPWOOD.

REFERENCES CITED

The following references are of record in the file of this patent:

UNITED STATES PATENTS

| Number | Name | Date |
| --- | --- | --- |
| 1,819,007 | Smith | Aug. 18, 1931 |
| 2,172,325 | Victor et al. | Sept. 5, 1939 |
| 2,184,376 | Beyer et al. | Dec. 26, 1939 |
| 2,358,536 | Reynolds | Sept. 19, 1944 |